United States Patent [19]

Patel

[11] Patent Number: 4,885,121
[45] Date of Patent: Dec. 5, 1989

[54] METHOD OF MAKING A DUAL DUROMETER SELF-LOCKING AND SEALING PLUG

[75] Inventor: Praful J. Patel, Livonia, Mich.

[73] Assignee: Chemcast Corporation, Madison Heights, Mich.

[21] Appl. No.: 209,814

[22] Filed: Jun. 22, 1988

Related U.S. Application Data

[62] Division of Ser. No. 80,850, Aug. 3, 1987, Pat. No. 4,784,285.

[51] Int. Cl.$^4$ .................. B29C 45/16; B32B 27/08
[52] U.S. Cl. .................... 264/255; 264/246; 264/297.3; 264/328.8; 425/116; 425/129.1; 425/130; 425/134
[58] Field of Search .............. 264/245, 246, 255, 513, 264/297.3, 328.8; 425/116, 129.1, 576, 523, 130, 134

[56] References Cited

U.S. PATENT DOCUMENTS

| | | | |
|---|---|---|---|
| 3,807,920 | 4/1974 | Aoki | 264/245 X |
| 3,878,282 | 4/1975 | Bonis et al. | 264/513 |
| 4,444,711 | 4/1984 | Schad | 264/255 X |
| 4,734,023 | 3/1988 | Nesch et al. | 425/130 |

FOREIGN PATENT DOCUMENTS 2063850 12/1970 Fed. Rep. of Germany ...... 264/245

Primary Examiner—Jeffery Thurlow
Assistant Examiner—Leo B. Tentoni
Attorney, Agent, or Firm—Neal A. Waldrop

[57] ABSTRACT

A continuous method of making a dual durometer self-locking, self-sealing plug for filling and sealing holes in panels. The plug is made from two different, chemically compatible thermoplastic materials by coinjection of the two molten components sequentially into a mold and cooling them concurrently to form the unitary plug.

4 Claims, 5 Drawing Sheets

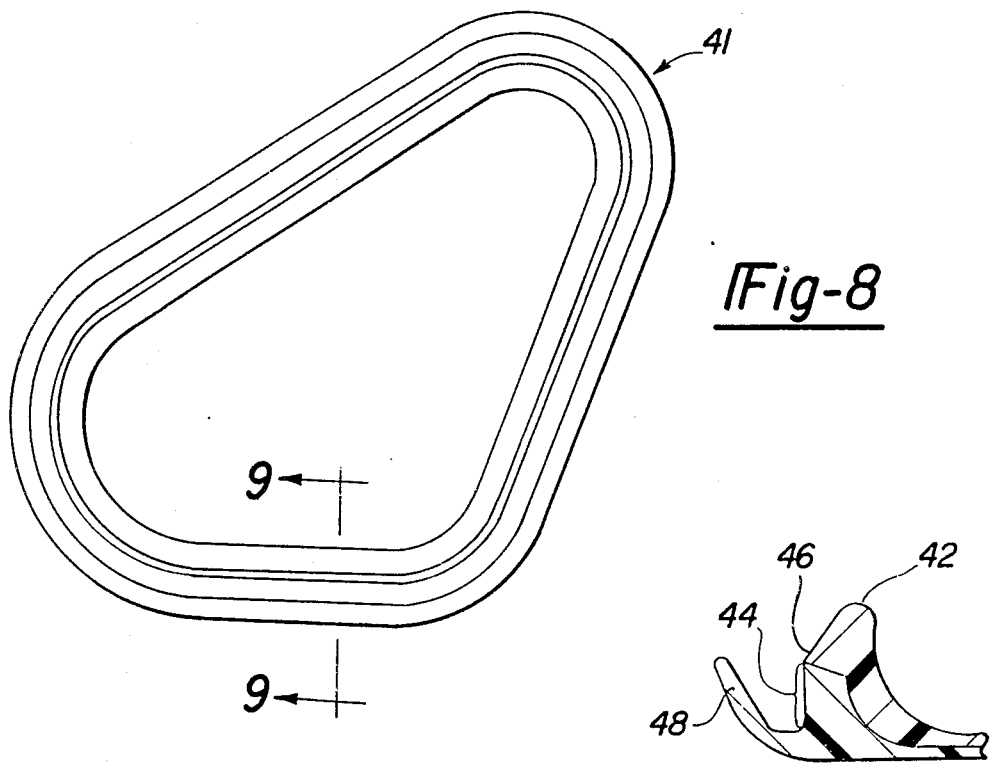
Fig-8
Fig-9
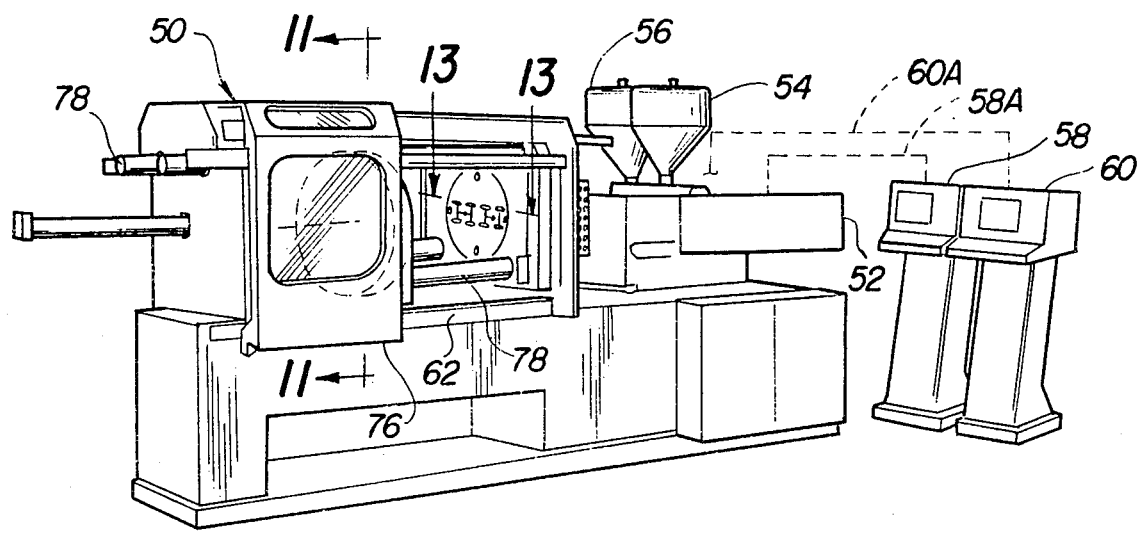
Fig-10

METHOD OF MAKING A DUAL DUROMETER SELF-LOCKING AND SEALING PLUG

BACKGROUND PROBLEM AND SUMMARY OF THE INVENTION

This invention relates to hole filling, self-locking and self-sealing plugs made of injection moldable plastics and to a method for making same.

In the manufacture of automobiles, refrigerators, stoves and other appliances there are metal panel portions such as automobile floor pans, door panels or other vertically oriented panels that contain openings, or holes, of various shapes and sizes to provide for tool access through the hole to enable assembly of the panel to its supports or the attachment of other components of the automobile or appliance to an interior surface of a panel. After assembly, it is necessary to fill the opening to restore the original panel contour. Heretofore, metal plug stampings have been used and such stamped plugs have been fastened in place by hot melt adhesives, by welding, brazing or by screws or the like through overlap portions of the replacement metal plug and the panel. Such metal replacements require preliminmary fabrication of the replacement plugs and manual assembly which is time consuming, expensive and labor-intensive, all of which is desirably eliminated.

The plugs of this invention are suitable to replace the heretofore used metal plugs and eliminate much of the previously required labor by fabricating the plugs from compatible plastic materials that are each thermoplastic and chemically similar, and which are configured so as to be insertable into a hole or opening in a panel by snapping the plug through the opening, to simultaneously lock the plug in place and seal against the inner periphery of the opening.

The plugs are self-locking and self-sealing and are fabricated from injection-moldable plastic components selected so as to provide all of the properties necessary to enable safe use in vehicles, etc., including high tensile and impact strengths, high resistance to dislodgement from concentrated forces applied to the central hole-filling portion of the plug from either side of the panel, high resistance to penetration or puncture particularly from an exterior applied force, and sealing resistance to leakage of moisture, gases or water through the opening.

The hole filling-locking portion is formed from a material having the requisite strength and hardness to make the plug self-locking and resistant to dislodgement and impact and penetration resistance over the range of temperatures of intended use, and the sealing portion is made from a chemically compatible material having the required resilience to permit sufficient deformation when pressed against the inner periphery of the opening to facilitate insertion of the unitary plug into the opening and to provide the required sealing between the resilient peripheral portion of the plug and the inner peripheral surface of the panel opening in a manner generally similar to the sealing of the grommet of U.S. Pat. No. 4,081,879.

The method of this invention is a process of injection molding two compatible thermoplastic materials into a mold which unite in the mold upon cooling to form a unitary plug. The plug is fabricated from two separate but chemically compatible thermoplastic injection moldable materials by co-injection, comprising the steps of injecting material having metal-like properties to form the hole filling and locking portions, slightly cooling the locking portion, injecting the resilient, softer material into the same mold into contact with the still hot, locking portion to form the sealing portion, and further cooling both portions to thus form the unitary dual durometer plug of this invention.

BACKGROUND PRIOR ART

U.S. Pat. No. 4,081,879 is the closest known prior art to this invention, and is owned by the owner of this invention. The '879 patent discloses a grommet or plug button made from a hard locking portion which simultaneously locks against the panel surface spaced outwardly from and surrounding the opening and a softer sealing portion which seals the grommet in the opening by contact between the outer periphery of the softer sealing portion and the entire inner periphery of the opening. The hard locking and softer sealing plastic materials disclosed in the '879 patent grommet are thermoplastic or thermosetting materials or mixtures thereof which are castable as plastisols such as vinyls, preferably polyvinyl chlorides. The grommet is formed by spraying the hard plastisol in an open mold and after partial gellation, then spraying the softer plastisol material into the mold in contact with the partially gelled hard part and then simultaneously curing the two plastisol materials at elevated temperatures to thus form a unitary grommet, or plug, structure. Vinyl plastisols are not satisfactory for making either the locking or sealing portion of the plugs of this invention.

U.S. Pat. No. 3,753,549, 3,804,366 and 4,139,590 disclose a flow control device such as a damper, or heater, door usable in an air conditioning or heating duct and methods for making such devices. The damper doors of the '549 and '366 patents are made from materials that are incapable of bonding together upon heating portions cast into a mold because of the chemical dissimilarity of the two materials; the disclosed hard material is a thermosettable epoxy hard material and the softer material is a thermoplastic vinyl plastisol. To overcome the bonding problem the '590 patent method comprises premixing some of the vinyl plastisol into the epoxy hard portion before casting that mixture into a mold and thereafter floating more vinyl plastisol over the partially gelled premixture of epoxy-polyvinyl chloride plastisol and then curing those components together at elevated temperatures.

The plugs of this invention differ structurally from the heater doors of the '549 and '366 patents because the heater doors are flow control devices that have no hard locking portion; such damper doors are neither self-locking nor self-sealing nor intended to function to plug and permanently seal an opening in a panel. The co-injection method used in making the plugs of this invention is basically dissimilar to the method of the '590 patent in that there is no step of premixing some of the softer plastic material into the hard thermosetting type resin prior to casting the mixture into the mold and no step of heating after casting in order to secure curing of the soft and harder portions.

The plugs of this invention differ from the grommets and plug buttons of the '879 patent structurally in that the central portion of the plugs of this invention that fill the hole, or opening, in the panel and also locks the plug in place has metal-like properties including high hardness, tensile and impact strengths and high resistance to penetration or rupture whereas the hole filling portion of the '879 grommet is the softer vinyl body portion which also functions as the resilient seal. When the '879 patent structure is a grommet, the hard locking portion is an annular ring only, and the central, hole-filing portion is the softer vinyl body portion which includes at least one flexible snout having a central opening that extends through the soft portion and provides a support for wires, rods or the like which extend through the panel opening; similarly, when the structure of the '879 patent is a plug button, the hard locking portion is an annular ring only and the central hole filling portion is the softer body portion which also seals but its central portion is devoid of snouts or openings for wires or the like, see FIG. 4. The co-injection continuous process of this invention is not disclosed in the '879 patent and is different from the '879 process of spraying vinyl plastisols into a number of identical open-ended die molds positioned on a conveyor that forwards the plastisol filled molds into a curing oven for curing and bonding the hard locking ring portion and the softer central body and sealing portion into a unitary grommet or plug button. In contrast, the co-injection process of this invention employs an injection molding machine which first injects molten thermoplastic material into a first mold cavity to form the hard hole-filling and locking material, then cools that injected portion material only slightly, indexes the mold into contact with a second mold cavity and injects molten, softer thermoplastic material into the second cavity to form the softer sealing portion, then further cools both the soft and hard injected materials to thus form the unitary plugs of this invention.

OBJECTS OF THIS INVENTION

The primary object of this invention is to provide a non-metallic, easily installable plastic plug which is less expensive than metal plugs to fabricate and install to fill and seal a panel opening and that can be safely used as a replacement for the heretofore used metal plugs in the manufacture of vehicles and appliances.

Another object of this invention is to provide a self-locking, self-sealing plastic plug of any desired configuration that is formable by sequential co-injection of two chemically compatible thermoplastic resinous materials into a single mold to form upon cooling a unitary plug comprising a hard, strong hole-filling and locking portion with metal-like properties and a softer sealing portion that primarily seals the plug in the opening by resilient, interfering contact with the inner peripheral surfaces of the opening and also prevents dislodgement of the plug from the opening from forces applied in the same direction as the force applied to install the plug in the opening.

A further object of this invention is to provide a continuous production method of forming the improved plastic plugs of this invention by sequential co-injection of two molten chemically compatible thermoplastic resinous materials into mating-multi-cavity molds that upon cooling form the unitary plugs of this invention.

BRIEF DECRIPTION OF THE DRAWINGS

FIG. 8 is another preferred embodiment of the present invention illustrating a plug of modified contour relative to that of the plugs of FIGS. 2, 4 and 6;

FIG. 9 is a sectional view taken along the lines 9—9 of FIG. 8;

FIG. 10 is a perspective view of an injection-molding apparatus useful in the practice of the method of this invention and showing the apparatus having its multi-cavity mold in its open position in which the movable mold half is shown in dotted lines;

FIGS. 13–16 diagrammatically illustrate the sequential steps of the process of this invention and the mold positions during start-up and continuous operation of the process of this invention.

Figure 11:
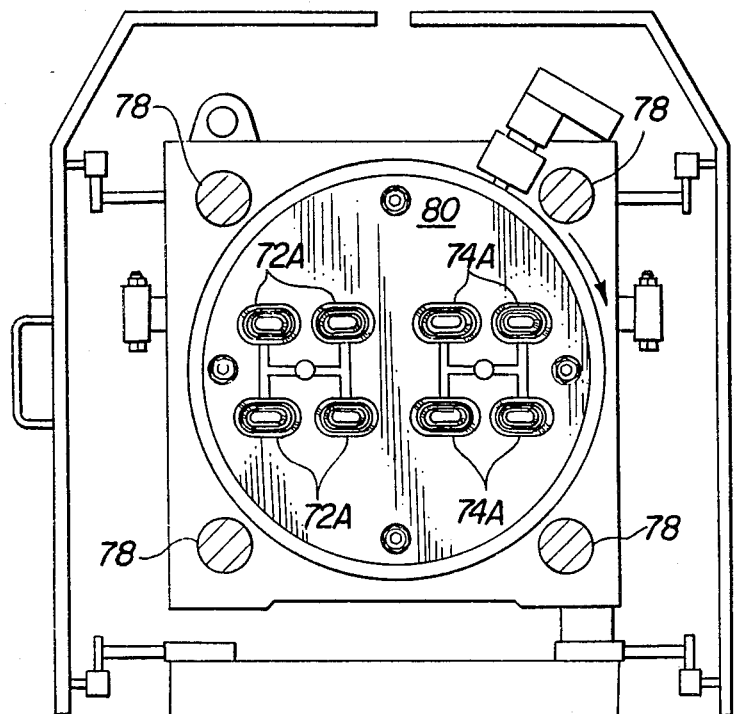
FIG. 11 is a front view of the rotatable multi-cavity mold shown in phantom in FIG. 10 and looking in the direction of the arrows 11—11 of FIG. 10, illustrating eight cavities for forming four oblong plugs of this invention, the cavities as shown being empty.
Figure 12:
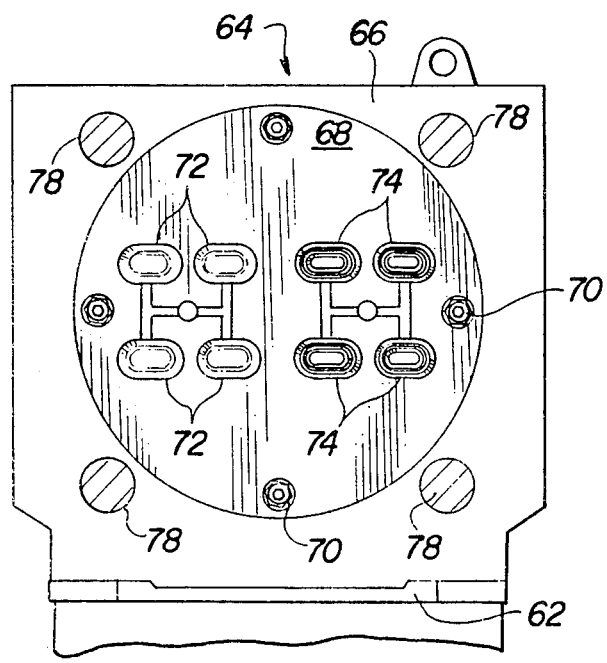
FIG. 12 is a front view of the fixed half of the multi-cavity mold support that is visible in FIG. 10, the cavities as shown being empty.
Figure 13:
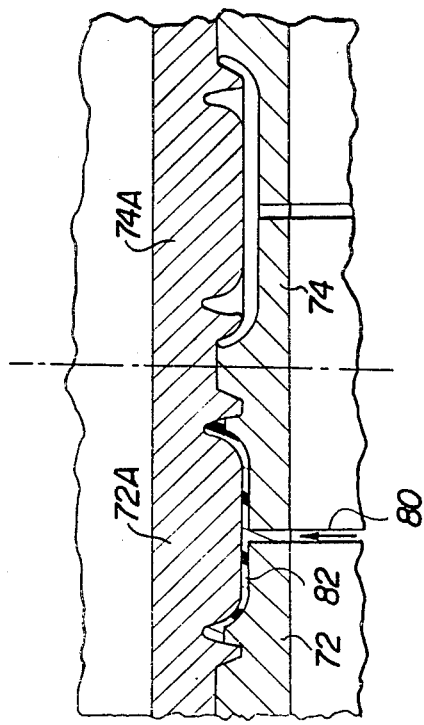
Figure 14:
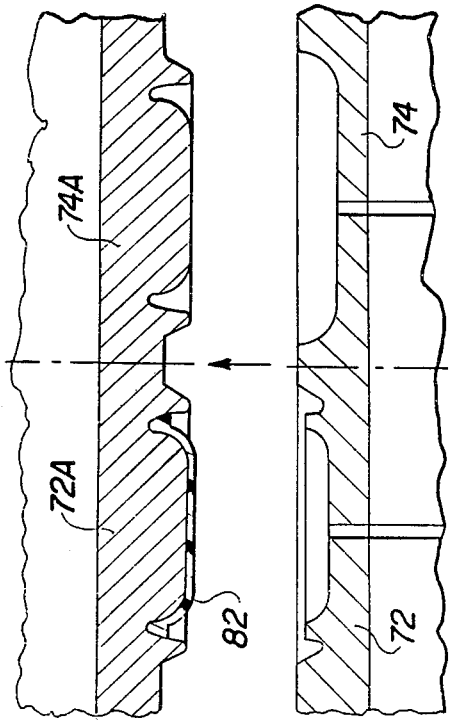
Figure 15:
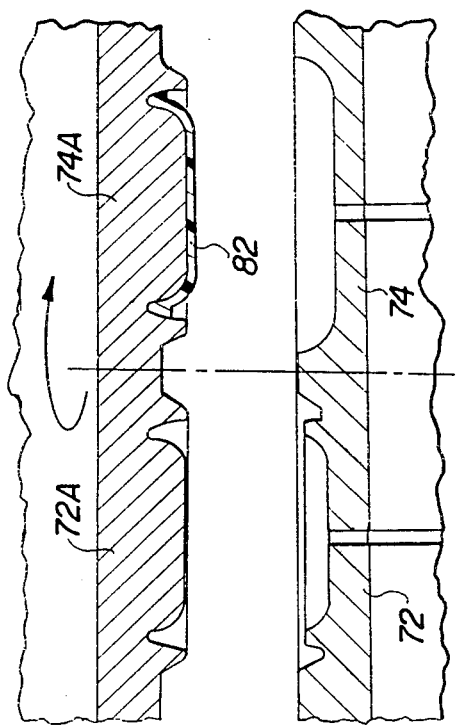
Figure 16:
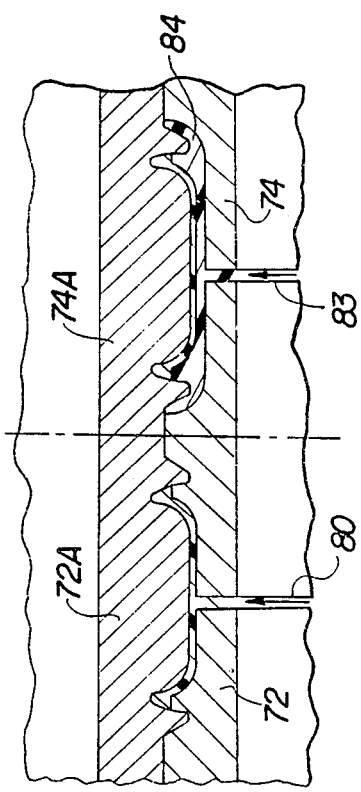

FIG. 13 is a diagrammatic, sectional view looking down and taken-along the line 13—13 of FIG. 10, illustrating the movable mold of FIG. 11 in closure with the fixed mold half of FIG. 12 and showing the first step at start-up of the injection process which injects hard plastic in the direction of the arrow into the mold cavity in the left-hand portion only of the molds;

FIG. 14 is a diagrammatic sectional view showing the mold half of FIG. 13 after separation of the movable molds of FIG. 11 and prior to rotation 180° to the right and in the direction of the arrow shown in FIG. 15;

FIG. 15 is a diagrammatic sectional view showing the mold of FIG. 14 immediately after the 180° rotation and prior to closure of the movable mold half;

FIG. 16 is a diagrammatic sectional view showing the mold halves of FIG. 15 after closure and illustrating the step of injecting hard plastic into the cavity on the left-hand end of the mold, and simultaneous injection of soft plastic into the right-hand end of the mold, which step is thereafter repeated during each cycle of the continuous process.

DESCRIPTION OF PREFERRED EMBODIMENTS

Figure 4:
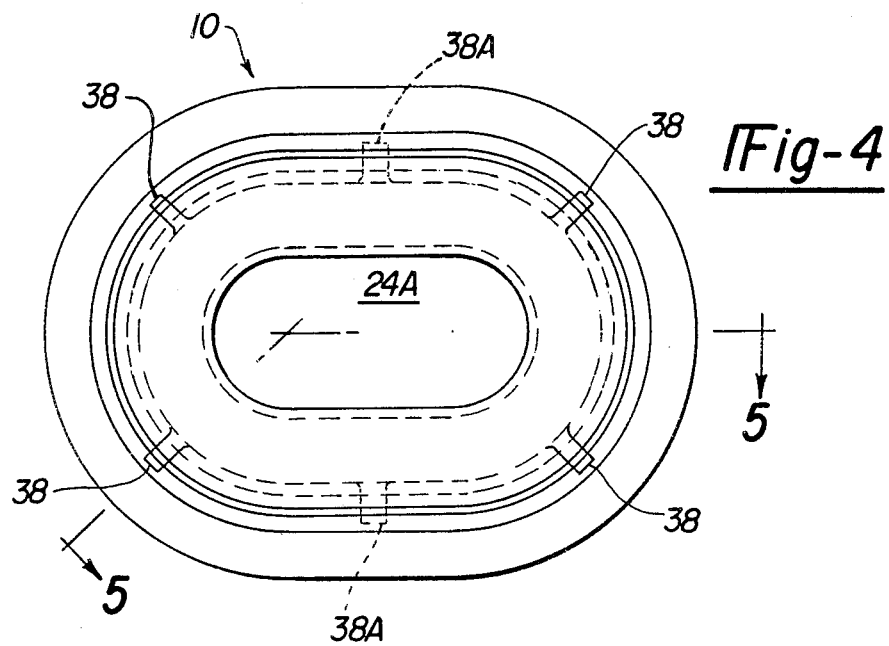
FIG. 4 is a bottom view of one preferred embodiment of the present invention illustrating a modified locking and sealing means.

FIGS. 2, 4, 6 and 8 illustrate embodiments of different representative forms of plugs of this invention and FIGS. 4 and 8 represent preferred embodiments for use in door panels and floor panels of automobiles as explained in greater detail hereinafter.

Figure 1:
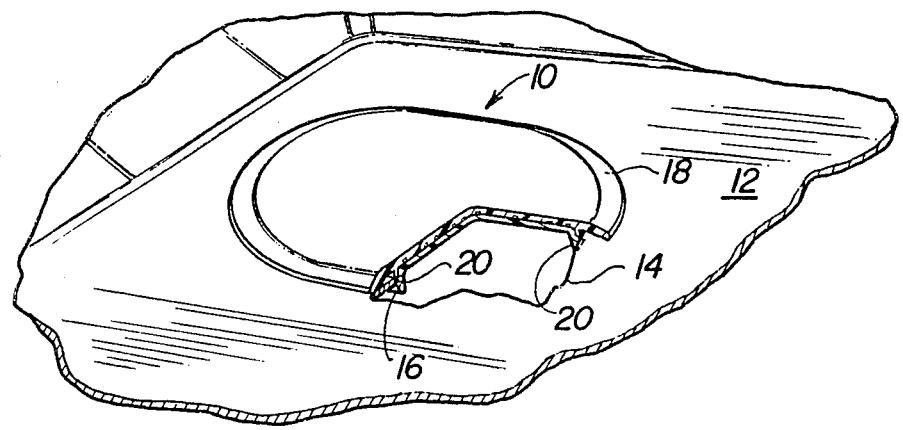
FIG. 1 is a perspective view of a broken away portion of a panel showing a partially cross-sectioned plug of this invention installed in place in an oblong shaped panel opening.

FIG. 1 illustrates a plug of this invention as it appears when installed in an opening in a typical panel. The plug, indicated generally by the reference numeral 10 is the plug illustrated in detail in FIGS. 2 and 3. The broken away portion 14 of a panel 12 is representative of, for example, the floor panel of an automobile with its top surface being the surface exposed in the passenger compartment. Panel 12 includes a broken away portion of an oblong shaped opening 16 which is the type routinely provided as a tool access opening to enable assembly operations in vehicle manufacture. Plug 10 fills opening 16 entirely, is locked in place and primarily seals by interference contact with the entire inner periphery of opening 16, in the manner to be further explained below. Plug 10 also seals secondarily, by contact between the external flange or wing portion 18 which is spaced outwardly from and surrounds the inner periphery of the opening 16. Plug 10 forms a substantially planar continuation of the upper surface of floor panel 12 and is usually unnoticeable because normally covered by carpet, a rubber mat or the like. The hard locking means protrude through the opening and face downwardly such that the entire surface of the plug that is exposed underneath the floor panel is the hard, tough hole-filling portion of the plug. Installation of the plug to fill opening 16 is normally effected by inserting the tapered locking portion generally designated 20 into opening 16 from the top surface of floor panel 12.

Figure 2:
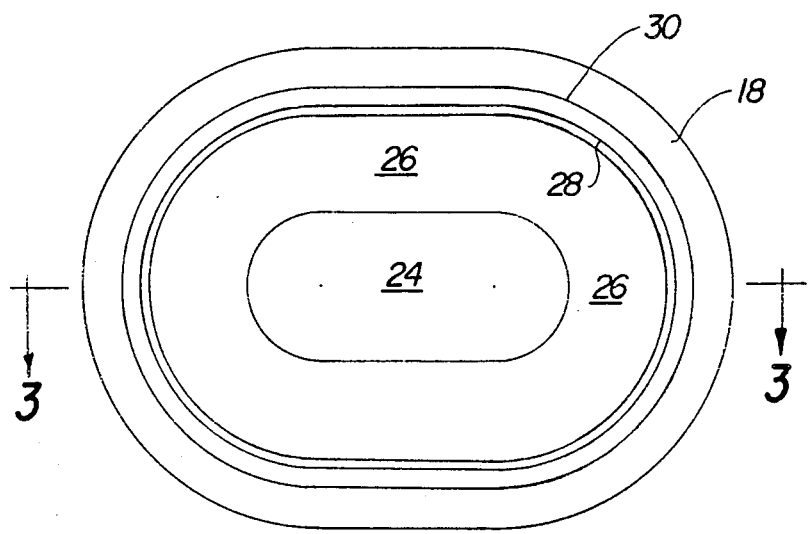
FIG. 2 is a bottom view of the embodiment of the present invention of the type shown installed in an opening in the panel in FIG. 1.
Figure 3:
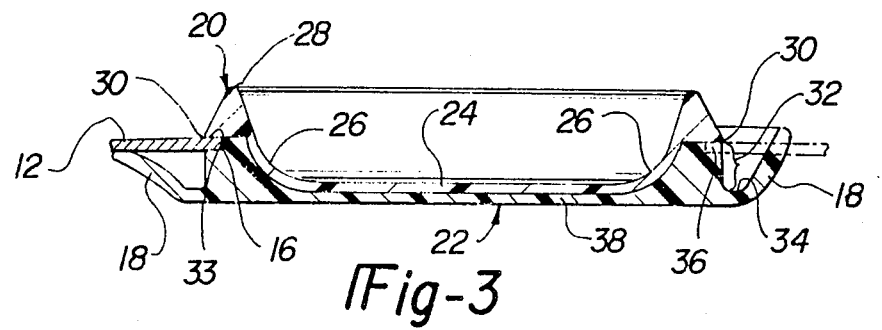
FIG. 3 is a sectional view taken along the lines 3—3 of FIG. 2.

As best seen in FIGS. 2 and 3 plug 10 comprises hard locking and hole-filling portion 20 and a softer, elastomeric sealing and hole covering portion generally designated 22. The materials which are suitable for forming portions 18 and 20 will be described in detail below but, in general, each is a thermoplastic resinous material that can be injected in molten condition into mold cavities of appropriate configuration and the materials are sufficiently chemically similar such that upon cooling the hard and soft materials unite and bond the materials in contact to form a unitary plug.

Locking portion 20 is generally oval or dish-shaped and comprises a hole filling central portion 24 that is substantially planar which smoothly curves upwardly and outwardly at areas designated 26 and terminates in a tapering, generally elliptical annular ring, triangular in cross section having an upper surface 28 and a ridge portion 30 at its outer circumferential lower edge. As shown in FIG. 3 on the left hand side, the inner periphery of opening 16 of panel 12 is slightly smaller than the outer periphery of ridge portion 30 and, as assembled, ridge portion 30 overlaps the external, or bottom, surface 33 of panel 12 surrounding the opening 16 and thus locks by direct contact over the entire 360° periphery of opening 16.

Figure 6:
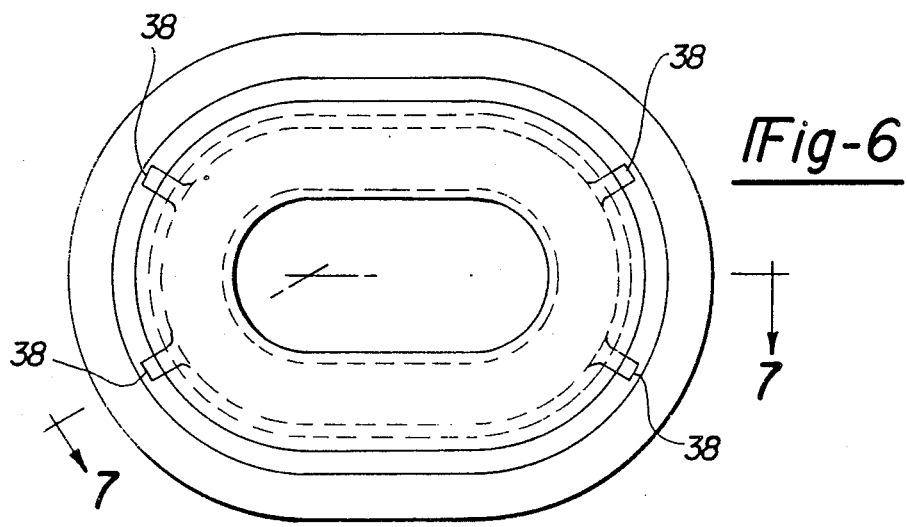
FIG. 6 is another embodiment of this invention illustrating a further modification of the sealing and locking means of the embodiment shown in FIGS. 4 and 5.
Figure 7:
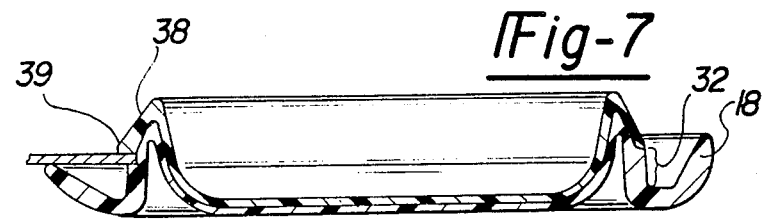
FIG. 7 is a sectional view taken along the lines 7—7 of FIG. 6.

The manner in which plug 10 seals opening 16 may be best understood by referring to the right side of FIG. 3 because panel 12 is there shown in phantom so that the as-molded shape and location of the elastomeric sealing portion 22 that is immediately adjacent to ridge portion 30 may be clearly seen at 36. As shown the elastomeric portion 22 forms a sealing band surface indicated by the bracketed area designated 32 which has the same, or approximately the same, circumferential dimension as ridge portion 30 and constitutes, approximately, an axial extension of the circumferential dimension of ridge portion 30 downwardly to trough 34. When the hard locking portion 20 is inserted into opening 16, since the circumferential dimension of ridge portion 30 is larger than opening 16 and locking portion 20 is hard and too rigid and resistant to radial compression to enable direct insertion in the axial direction, it is necessary to cock or skew the plug 10 in order to insert it in opening 16 in panel 12. In this regard, plug 10 is similar to the grommet 10 of U.S. Pat. No. 4,081,879 which is illustrated in FIGS. 1, 6 and 7 of that patent being inserted into a panel opening, and insertion is achieved in a similar manner. In brief, a portion of ridge portion 30 of plug 10 is inserted in opening 16, and by the application of force in a direction generally parallel to the plane of opening 16, the portion of sealing band surface 32 immediately contiguous to ridge portion 30 is deflected, or compressed, at 36, sufficiently to allow the opposite other portions of ridge portion 30 to deflect, at the points of contact with the inner periphery of opening 16, to snap through and achieve the inserted position shown at the left hand side of FIG. 3. When the snap-in occurs, as it normally does with plugs designed to overlap the periphery of opening 16 only a few thousandths of an inch and with a selected hardness of ridge portion 30 to allow the small, necessary radial deflection, a pressure tight, interference seal is established by contact between a portion of elastomeric sealing band surface 32 and the inner periphery 16 resulting from a combination of resilience of the material of sealing portion 22 and the stretching forces consequent from the harder stronger ridge portion 30 placing a tension or stretching force on the elastomeric material that is distorted to the compressed assembled position as seen in the left side of FIG. 3.

Sealing portion 22 comprises central portion 38 which overlies and is bonded and unitary with the central portion 24 of locking portion 20, and includes at its periphery upwardly and outwardly extending wing portion 18. Wing portion 18 is shown, as molded, in the right side of FIG. 3 and in its flattened, or deflected, secondary sealing position, after installation in opening 16 of panel 12 at the left side of FIG. 3. Wing portion 18, in addition to sealing by resilient pressure contact with the flat surface of panel 12 surrounding opening 16 also functions to prevent dislodgement of plug 10 due to forces applied downwardly on central surface 38 such, for example, as the concentrated force of a passenger's heel who steps directly on plug 10 in the floor panel of a vehicle. In such an instance, the resistance to deflection of central portion 24 and its bonded unity with overlying resilient central portion 38 and resulting wedging forces constitute the major resistance to downward dislodgement but wing portion 18 also significantly contributes. The mass of wing portion 18 and the portion of sealing band surface 32 underlying the inner end of panel 12 is sufficient, even though elastomeric, to resist compression sufficiently to pass through opening 16.

Figure 5:
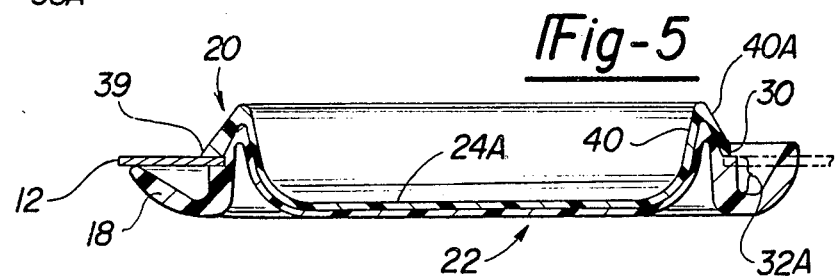
FIG. 5 is a sectional view taken along the lines 5—5 of FIG. 4.

A modified plug 10 is shown in FIGS. 4 and 5. The plug of FIGS. 4 and 5 is modified relative to the FIG. 2 plug structurally in the hard sealing portion 20 to provide greater locking surface interference with the flat surface of panel 12 surrounding the opening 16 and thus greater resistance to dislodgement of larger sizes of plugs, or plugs subjected to rigorous use conditions. The FIG. 4 plug is also modified structurally to enhance sealing. As best seen in FIG. 5, hard locking portion 20 includes a plurality of circumferentially spaced buttress-type reinforcing projections 38 molded integrally into the annular locking ring 20. As shown four buttress members 38 are located on the curving end portions of locking ring 20; however, the locations and number of buttress members may be varied as needed, for example, to include additional buttresses 38A, shown in phantom, to enhance resistance to dislodgement from forces applied to the central portion 24A, for example road objects thrown into contact with the underside of plug 10 during vehicle operation, or the like. Buttress 38 is shown in cross section in FIG. 5, left end. The shape and degree of outward projection from the tapered outer surface of locking ring 20 increases from the top to the bottom of that ring to a maximum degree at the lower end portion 39 of buttress 38. The amount of the projection at the outer edge of ridge portion 30 may be seen by comparing the overlap of lower end portion 39 with the top surface of panel 12 at the left side of FIG. 5 with the outer dimension of ridge portion 30 that is visible on the right side of FIG. 5. The additional projection outwardly at 39 provides extra overlap with the adjacent surface of panel 12 when installed and this added overlap increases the resistance to dislodgement resultant from concentrated forces that may be applied from beneath panel 12 and toward the end portions of plug 10. Locking portion 20 is also modified from the solid cross-sectional triangular shaped ring construction shown in FIG. 3 to the vee-shaped dual leg construction 40, 40A best seen at the right hand end of FIG. 5. This modification, particularly in large plugs is useful to reduce the transverse rigidity of the plug and can assist in reducing the force required to insert such a plug in its opening.

The sealing modification to plug 10 may be seen from inspecting the right hand end of FIG. 5. Ridge portion 30 is slightly smaller in its circumferential edge dimension than the outer dimension of the contiguous sealing band surface designated by the bracketed area 32A. It is thus apparent that an additional degree of radial compression of the circumference of sealing band surface 32A, occurs during installation as the inner end of panel 12 contacts and compresses the resilient material contiguous to and protruding outwardly from ridge portion 30. These two modifications make the plug structure shown in FIG. 4 the preferred structural configurations for use under the most demanding conditions that require greater resistance to dislodgement and better sealing, for example in larger plugs in the floor panels of trucks, or the like.

The plug of FIGS. 6 and 7 illustrates modification of the plug of FIG. 2 to include buttresses identical to the buttresses 38 shown in FIG. 4 but which does not include any modification of the sealing band surface 32 of the FIG. 2 plug of the type present at 32A of FIG. 5.

Another preferred plug of the type of plug 10 is illustrated in FIGS. 8 and 9. This triangular shaped plug generally designated 41 is adapted to fill and seal a tool access opening in an automobile door to enable installation of an outside rear view mirror. The plug is installed in the door panel forming the inner end of the door adjacent to the door hinge and visible only when the door is opened. Plug 41 is comprised of a locking annular ring portion 42 having a similar triangular shaped, solid cross-sectional form to that of corresponding locking portion 20 of FIG. 3. Plug 41 also includes a sealing band surface indicated by the bracketed area 44 which has approximately the same circumferential edge dimension as that of the outer circumferential edge of ridge portion 46 and is an axial continuation of that ridge portion. Wing portion 48 is generally similar to wing portion 18 of plug 10 shown in FIG. 3 and plug 41 is installed, locks and seals automatically upon installation as above described for plug 10 shown in FIGS. 2, 4 and 6.

As above stated, the conditions of anticipated use of the plugs of this invention, particularly in vehicle manufacture, are demanding and rigorous and safety considerations require that the plugs possess physical and mechanical properties that heretofore have been available only in metal plugs, usually steel, or aluminum. For example, the plugs must function, that is, remain self-locked in place at temperatures ranging from $-40°$ F. through $260°$ F. for extended time periods, such as up to about 100 hours, and remain sealed in the opening and resistant to water leakage at the end of such temperature period when subjected to a 10 minute static leak test using a six inch head pressure of water, conducted at room temperature, that is, about 70–75° F. Such plugs must resist dislodgement from the floor pan opening when subjected to a push out force of 75 to 100 pounds, minimum, applied to the approximate center of the hole-filling portion in the direction opposite to, and in a second test in a direction the same as, the direction in which force was applied to insert, or snap, the plug in place. Such floor pan plugs must also have sufficient tensile and impact strength to resist puncture or penetration by flying stones or other objects encountered as the vehicle passes over unpaved, uneven roads; they must also resist undue temperature deformation due to expansion or contraction, and resist weak acidic or alkaline solutions potentially splashed against the outer surface of the plug for at least five years, or more.

In accordance with this invention, it has been found that a single combination of two types of thermoplastic resinous materials possesses all of the physical and mechanical properties that are required for forming satisfactorily functional plugs of this invention and at the same time provides two materials that are chemically compatible to a sufficient degree to enable the forming of the unitary plugs of this invention by co-injection into a multi-cavity mold. The type of thermoplastic resinous materials suitable for use in forming the hard, hole-filling, locking portion of this invention is a polyolefin resin, preferably polypropylene, having a durometer hardness reading in the range of about 60 to about 110 on the Rockwell R scale as measured by ASTM Method D785 for Rockwell Hardness of Plastics and Electrical Insulating Materials. The best material known to me for use in forming the hard locking portion of the plugs of this invention is a polypropylene resin-based material reinforced with glass fibers in an amount of about 8% to about 32%, preferably 10%±2%, by weight of glass fibers, balance polypropylene, which material after injection molding forms a hard locking portion having a hardness reading in the range of about 75 to about 100 on the R scale, ASTM Method D785.

The best known glass fibers for use are chopped strands having lengths of about ⅛" to about ¼". Such fibers typically range in diameter to length ratio of about 2 to 20, and preferably about 3 to 16. A number of general purpose polypropylene materials may be used satisfactorily, and are available from a number of suppliers in the United States, including Hercules' Himont ™ polypropylene general purpose resins designated Pro-Fax 6323 and 6523, polypropylene homopolymer from Exxon, Gulf or Amoco.

Thermoplastic resinous material suitable for use in forming the softer sealing portion of the plugs of this invention is a thermoplastic elastomeric material consisting essentially of a blend of thermoplastic crystalline polyolefin resin and monoolefin copolymer rubber and having a durometer hardness reading in the preferred range of about 64 Shore A to about 50 Shore D and for certain uses having less rigorous requirements of both strength and sealing the hardness range can satisfactorily be about 55 Shore A to about 55 Shore D, ±10%. Suitable compositions of this type are disclosed and described in U.S. Pat. No. 4,130,535 and 4,311,628. The preferred crystalline polyolefin resin in the blend is polypropylene and the cured monoolefin copolymer rubber in the blend is known generally in the trade as EPDM rubber, which can be satisfactorily cured either with sulfur or peroxide curatives, and preferably is cured with a phenolic curative as disclosed in U.S. Pat. No. 4,311,628. Such EPDM rubbers are commercially available in the United States from Monsanto Chemical Company under the trademark Santoprene TM rubber. A number of satisfactory plugs of this invention having the configuration illustrated in FIG. 8 have been made by using a polypropylene homopolymer resin-chopped glass fiber reinforced material containing 10% by weight of ⅛" length chopped glass fibers for the hard locking portion obtained from Rhetech Company under the trade designation G 1OP100, and a Santoprene TM thermoplastic rubber for the soft sealing portion by using Santoprene TM rubber designated 101-64, which is a black general purpose Santoprene TM rubber having a hardness of 64 Shore A.

The plugs of this invention are preferably made by a continuous co-injection method by using an injection machine of the type shown in FIGS. 10, 11 and 12 and the sequence of steps diagrammatically illustrated in FIGS. 13-16 as will now be described in detail. The machine shown in FIGS. 10, 11 and 12 is a commercially available injection molding machine having two independently controlled horizontal injection units that is capable of injecting two different materials from its injection units into a plurality of molds, automatically in a continuous cycle. The machine is manufactured by John Brown Co. and is available in the United States from Negri Bossi S.p.A. of Milan, Italy. As illustrated in FIG. 10, the machine generally designated 50 comprises a pair of horizontal injection units which are of conventional form and are indicated only diagrammatically at 52. Separate plastic feed bins 54, 56 are interconnected to the separate injection units 52 and supply the hard polypropylene resinous material to the near side injection unit and the softer Santoprene EPDM rubber material to the far side injection unit (not shown). The injection units are independently controlled by electronic control units of conventional type with control means 58 effecting control for the near side injection unit through connecting means 58A, and control means 60 effecting control of the far side injection unit through connecting means 60A. Fixed mold support means indicated generally by the number 64 are mounted on the machine bed 62 and as shown in FIG. 12 comprises mold support plate 66 and mold 68 which is affixed to support plate 66 by a plurality of bolts 70. As illustrated, mold 68 is provided with eight cavities. The four cavities on the left side of mold 68, designated 72, have a configuration which forms the hard, hole-filling, locking portion of the plug 10 upon cooling of the injected harder thermoplastic material. The four cavities in the right half of mold 68, designated 74, have a configuration which forms the soft sealing portion of the plug 10 when the molten injected softer thermoplastic material is cooled. Horizontally movable mold support means 76 is mounted on the left end of bed 62 and supports mold 68 which is reciprocated from the open position shown in FIG. 10 to the right, along upper and lower support rods 78 to a closed position in which the mold 80, which is shown in phantom in FIG. 10 and in front view in FIG. 11, is in direct sealed contact with mold 68. Mold 80 is provided with the other half of each of the mold cavities 72, 74 that are mounted in fixed mold 68 and are correspondingly designated as 72A, 74A. When molds 68 and 80 are in the closed position the plastic materials in injection units 52 are injected into the cavities in accordance with a cyclical sequence which is diagrammatically illustrated in FIGS. 13-16. FIGS. 13-16 illustrate the interfitting of the cavities which are supported by mold halves 68 and 80 as each portion of the cycle of movements of machine 50 occur, and it is to be understood that the open and closed positions of the mold halves and the juxtaposition of the cavities is merely a diagrammatic representation of only one pair of mold cavities out of the four pairs shown in FIGS. 11 and 12.

The process is continuous, after an initial start up, and in each injection step, hard plastic is injected into the cavities 72A on mold 80 and simultaneously softer, elastomeric plastic is injected into the cavity 74 which forms the sealing portion of the plug. However, in order to prepare for injection of soft material which will overlie and contact the hard locking portion it is necessary to juxtapose cavity 74 with a mold cavity 74A which contains a previously cooled hard portion of the plug. Since each side by side injection unit 52 contains only the hard plastic, or alternatively, the soft plastic material, and injection of the hard material must be into an empty mold, the process requires that mold cavities on mold 80 that have been injected in the previous cycle then be rotated from the position of cavities 72A on the left half of mold 80 as seen in FIG. 11, to the right half position of the cavities 74A as seen in FIG. 11. This is accomplished by a 180° rotation of mold 80 about its horizontal axis after movable support 76 begins moving horizontally to the left as seen in FIG. 10 to separate the molds.

FIGS. 13-16 show all cycles from the initial start-up step to continuous production. At start-up, in the first step, with the molds 80 and 68 in closed position, hard plastic is injected into the cavity defined by mold halves 72A and 72 through sprue 80, and is cooled slightly to form hard locking portion 82, as shown in FIGS. 13, 14. Then, mold support means 76 moves horizontally to the left carrying mold 80 to its open position, as shown in FIGS. 10, 14. During horizontal separation, mold 80 is, preferably, actuated to rotate 180° to the right in the direction of the arrow shown in FIG. 15 to thus position the hard locking portion 82 in the cavity on the right side of the mold 80 as shown in FIG. 15. Alternatively, initiation of rotation can be delayed until mold 80 reaches its open position. Mold support means 76 then horizontally moves to again place the mold cavities 72A, 74A into juxtaposition with fixed mold cavities 72, 74 on mold 68.

As shown in FIG. 16, with the molds 68, 80 juxtaposed, soft plastic is injected through sprue 83 into the mold cavity in mold half 74 to form the sealing portion 84 of the plug; simultaneously, hard plastic is injected into the cavity in mold half 72A to form, upon cooling, the hard portion 82 of plug 10. Simultaneous cooling of contiguous portions 82 and 84 in mold half 74 occurs while the molds 68, 80 are in closed position and requires a short time, for example 1-5 seconds. Mold support means 76 then translates to the left following the cycle of injection shown in FIG. 16, and the completed unitary plug 82, 84 is ejected from mold 80 usually at the fully-opened position shown in FIG. 15. Mold 80 is then rotated 180° about its horizontal axis, which is the same axis as the axis of movement of mold 80 to its open position. Alternatively as above indicated with respect to start-up, during the time that mold 80 is moving toward its open position the rotation may simultaneously occur with ejection occurring in the right side position, if desired. In either case, ejection insures that an empty mold 72, 72A is ready for injection of molten hard plastic material when mold half 80 next moves to its closed mold position. Repetition of the steps illustrated in FIGS. 16 and 15 thereafter makes the process continuous.

The above described process has a number of advantages over other processes by which the plugs of this invention could be manufactured. For example, plugs 10 could be made in separate molds. The hard portion 82 is first made in a single cavity mold, cooled, ejected and then hand placed into a second mold configured to receive the cooled hard portion and to enable injection of softer material to overlay the hard portion and form the soft portion 84. However, such process does not insure that the hard and soft portions will be bonded into a unitary article at the interface between the hard and soft portions of the plug. Satisfactory bonding is attainable, however, by using an adhesive applied in a thin layer on the cooled interface surfaces of the hard portion before positioning it in the second mold and a wide variety of suitable adhesives known to those skilled in the thermoplastic materials injection molding art may be satisfactorily employed for that purpose. Moreover, such a two mold process is less efficient in time, and more costly in labor and materials than the above described continuous coinjection process of this invention.

In practicing the preferred coinjection process of this invention it has been found to be desirable in order to insure that the hard and soft portions bond and unite into a unitary plug to control the degree of cooling of hard portion 82 prior to injecting the molten soft thermoplastic material to form soft portion 84.

Excellent bonding and unity of the hard and soft plug portions is obtained by injecting the molten polypropylene-based resin material into its cavity at a temperature in the range of about 370°-400° F., preferably 380°-390° F., and cooling the injected hard portion only to a partially solidified state sufficient to maintain its shape while positioned in the mold at a temperature in the range of about 320° to 340° F., preferably 325°-335° F. A suitable injection temperature for the selected Santoprene soft portion material is in the range of about 370°-420° F. preferably 375°-390° F. and results in high quality unitary products, particularly when the temperature of the hard portion is within the above stated ranges.

The temperature of hard portion 82 at the time the soft thermoplastic material is injected into its mold portion contiguous to the partially solidified hard portion is preferably the highest temperature that permits the slightly cooled hard portion to maintain its form when the hot, softer thermoplastic material is injected into contact with the cooled hard portion 82. This temperature will vary somewhat with the specific composition of the thermoplastic material being used for the hard part of plug 10. In general, the higher the quantity of polyolefin that is polypropylene, in contrast to polyethylene or mixtures thereof, the higher the temperature at injection and thus the higher the temperature the cooled portion will have in order to be form retaining when the Santoprene material is injected. Similarly, as the glass fiber content increases the effective melting temperature also increases. As is readily apparent to those skilled in the art of injection molding, it is desirable to keep the cooling time for both portions 82, 84 as short as possible in order to maximize the rate of production and thus overall economy. Selection of such parameters, and the best materials to suit the performance requirements of particular applications is readily and easily performed by using the specific material disclosures and these general guidelines.

The embodiments of the invention in which an exclusive property or privilege is claimed are defined as follows:

1. A continuous method for making a self-locking and sealing plug for filling and sealing an opening in a panel comprising:
   (1) providing progressive injection molding means having a pair of injection units,
   (2) providing in the first of said units a molten thermoplastic resin-based polyolefin material having a durometer hardness reading at ambient temperature of about 60 to about 110 Rockwell R,
   (3) providing in the second of said units a molten thermoplastic electomeric material consisting of a blend of thermoplastic crystalline polyolefin resin and cured monoolefin copolymer rubber and having a durometer reading at ambient temperature of about 65 Shore A to about 50 Shore D,
   (4) providing first and second mold means having multi-cavities respectively and relatively movable between open positions and two alternate closed molding positions,
   (5) configuring said cavities of said first mold means and at least one of said cavities of said second mold means to cooperate and provide a first complete mold cavity when said mold means are at either of said closed molding positions to form an opening-filling portion of said plug upon injection of said molten thermoplastic material from said first injection unit into said first complete mold cavity,
   (6) configuring at least one other of said cavities of said second mold means to cooperate with said cavities of said first mold means and provide a second complete mold cavity shaped when said mold means are at either of said closed molding positions and a hardened opening-filling portion of said plug is within the cooperating cavity of said first mold means to form a sealing portion of said plug having portions in intimate contact with portions of said opening-filling portion upon injection of said molten thermoplastic material from said second injection unit into said second complete mold cavity,
   (7) heating said thermoplastic material in said first unit to a temperature within a range of about 380° F. to 390° F., and heating said thermoplastic material in said second unit to a temperature within a range of about 375° F. to 390° F.,
   (8) moving said mold means to one of said closed molding positions, (9) injecting thermoplastic material from said first unit into said first complete mold cavity to form an opening-filling portion,

(10) cooling said first complete mold cavity,

(11) moving said mold means to their open positions,

(12) while retaining the opening-filling portion within the cavity of said first mold means, simultaneously moving said mold means and said opening-filling portion within the last named cavity to the other of said closed molding positions,

(13) simultaneously injecting said heated thermoplastic materials from said first and second units into said first and second complete mold cavities respectively to form an opening-filling portion and a molded part in said first and second complete mold cavities respectively,

(14) cooling said mold means to partially harden said thermoplastic materials therein and to cool said opening-filling portion in said first complete mold cavity to a temperature within a range of about 325° F. to about 335° F.;

(15) moving said mold means to their open positions,

(16) ejecting the partially hardened part formed in said second complete mold cavity,

(17) while retaining the partially hardened opening-filling portion within the cavity of said first mold means that cooperated to form said opening-filling portion, simultaneously moving said mold means and said opening-filling portion at said cooled temperature within the last named cavity to the other of said closed molding positions,

(18) repeating steps (13)–(17), thereby in accordance with injection of said molten materials into said first and second complete mold cavities per step 13, to units and bond said opening-filling portion with a sealing portion of said plug formed in said second complete mold cavity and simultaneously to form another opening-filling portion of said plug in said first complete mold cavity.

2. A method according to claim 1, wherein the material recited in step (2) and injected into said first complete mold cavity to form said opening-filling portion is a chopped glass fiber reinforced polypropylene.

3. A method according to claim 2 wherein the chopped glass fiber provides about 10% by weight of the material and the balance is a resin based polypropylene, the glass fiber reinforced polypropylene material forming an opening-filling portion having a Rockwell hardness on the R scale in a range of about 75 to 100.

4. A method according to claim 1, wherein the material recited in step (3) and injected into said second complete mold cavity to form said sealing portion consists essentially of a blend of polypropylene and cured ethylene propylene diene rubber.

* * * * *